(12) United States Patent
Rinker et al.

(10) Patent No.: US 8,158,084 B2
(45) Date of Patent: *Apr. 17, 2012

(54) CONTROL SCHEME FOR ENHANCED FILTERED WATER SYSTEMS

(75) Inventors: Edward B. Rinker, Oakland, CA (US); Janet Elizabeth Lane, San Anselmo, CA (US); Simon S. Litvin, Boston, MA (US); Ilya Ilyin, St. Petersburg (RU); Alexander Chaliyan, St. Petersburg (RU); Dmitry Logatchev, St. Petersburg (RU); Michael Gershman, Zoran (IL); Valery Pavlov, St. Petersburg (RU); Semyon Kogan, Newton, MA (US)

(73) Assignee: Brita LP, Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/903,027

(22) Filed: Oct. 12, 2010

(65) Prior Publication Data

US 2011/0024456 A1  Feb. 3, 2011

Related U.S. Application Data

(63) Continuation of application No. 12/720,069, filed on Mar. 9, 2010, which is a continuation of application No. 11/015,395, filed on Dec. 16, 2004, now Pat. No. 7,713,482.

(60) Provisional application No. 60/531,004, filed on Dec. 18, 2003.

(51) Int. Cl.
*B01L 3/02* (2006.01)

(52) U.S. Cl. ........ 422/521; 422/501; 422/522; 422/523; 210/203

(58) Field of Classification Search .................. 422/501, 422/509, 513, 521, 522, 523, 534; 221/9, 221/10, 12, 13; 426/425, 431, 432, 433, 426/435; 210/198.1, 203
See application file for complete search history.

(56) References Cited

U.S. PATENT DOCUMENTS 2,328,110 A   8/1943   Thompson et al.
(Continued)

FOREIGN PATENT DOCUMENTS

EP      0224335 B1    6/1967
(Continued)

OTHER PUBLICATIONS

Dec. 20, 2010; Non-Final Office Action, U.S. Appl. No. 12/102,516.
(Continued)

*Primary Examiner* — Jill Warden
*Assistant Examiner* — Dwayne K Handy
(74) *Attorney, Agent, or Firm* — Stacy H. Combs

(57) ABSTRACT

An enhancement control system that can be used as part of an enhanced water system to produce enhanced filtered water is described. The enhancement control system includes at least one enhancement delivery element that can dispense an enhancement(s) into filtered water in response to an enhancement delivery instruction(s). The enhancement control system can also include an input element that can enable transmittal of the enhancement delivery instruction(s) from a user to the enhancement delivery element(s). The control system can also include a memory element that can store information about the user and the user's preferences and information about the enhanced water system. The control system can also include a communication element that can provide information from the enhanced water system to the user. The control system can also include a monitor element that can gather data from outside the enhanced water system, such as user health information or environmental information, and provide the data to the enhanced water system. In some embodiments, a control logic element can be used to coordinate and control operation of the elements of the enhanced water system.

6 Claims, 13 Drawing Sheets

U.S. PATENT DOCUMENTS

| | | | |
|---|---|---|---|
| 2,502,603 | A | 4/1950 | Tanner |
| 2,502,610 | A | 4/1950 | Wegman |
| 2,631,521 | A | 3/1953 | Atkins |
| 2,705,091 | A | 3/1955 | Marchand |
| 2,740,556 | A | 4/1956 | Baron |
| 2,879,952 | A | 3/1959 | Pollitz et al. |
| 3,255,691 | A | 6/1966 | Schwartz |
| 3,375,913 | A | 4/1968 | Norris, Jr. |
| 3,463,361 | A | 8/1969 | Cook et al. |
| 3,568,887 | A | 3/1971 | Jacobs |
| 3,814,548 | A | 6/1974 | Rupp |
| 3,822,018 | A | 7/1974 | Krongos |
| 4,172,796 | A | 10/1979 | Corder |
| 4,324,494 | A | 4/1982 | Pryor |
| 4,414,996 | A | 11/1983 | Klepa |
| 4,465,488 | A | 8/1984 | Richmond et al. |
| 4,528,095 | A * | 7/1985 | Byrne ................... 210/206 |
| 4,565,302 | A | 1/1986 | Pfeiffer et al. |
| 4,582,223 | A | 4/1986 | Kobe |
| 4,674,657 | A | 6/1987 | Daniels |
| 4,759,474 | A | 7/1988 | Regunathan |
| 4,786,500 | A | 11/1988 | Wong |
| 4,817,822 | A | 4/1989 | Rand et al. |
| 4,860,923 | A | 8/1989 | Kirschner et al. |
| 5,036,462 | A | 7/1991 | Kaufman et al. |
| 5,045,195 | A | 9/1991 | Spangrud |
| 5,076,425 | A | 12/1991 | Plone |
| 5,114,045 | A | 5/1992 | Herpe |
| 5,114,048 | A | 5/1992 | Minke |
| RE33,969 | E | 6/1992 | Richter |
| 5,200,070 | A | 4/1993 | McMenamin |
| 5,211,973 | A | 5/1993 | Nohren |
| 5,215,659 | A | 6/1993 | Ando |
| 5,290,442 | A | 3/1994 | Clack |
| 5,328,597 | A | 7/1994 | Boldt, Jr. et al. |
| 5,342,518 | A | 8/1994 | Posner |
| 5,390,587 | A | 2/1995 | Wu |
| 5,399,260 | A | 3/1995 | Eldredge et al. |
| 5,427,682 | A | 6/1995 | Vogel |
| 5,433,343 | A | 7/1995 | Meshberg |
| 5,443,739 | A | 8/1995 | Vogel |
| 5,454,944 | A | 10/1995 | Clack |
| 5,536,394 | A | 7/1996 | Lund |
| 5,560,393 | A | 10/1996 | Clack |
| 5,587,089 | A | 12/1996 | Vogel |
| 5,688,397 | A | 11/1997 | Malmborg |
| 5,918,768 | A | 7/1999 | Ford |
| 5,922,378 | A | 7/1999 | Kagan et al. |
| 5,931,343 | A | 8/1999 | Topar |
| 5,941,380 | A | 8/1999 | Rothman |
| 5,980,959 | A | 11/1999 | Frutin |
| 6,024,012 | A | 2/2000 | Luzenberg |
| 6,058,718 | A | 5/2000 | Forsberg et al. |
| 6,098,795 | A | 8/2000 | Mollstam |
| 6,099,735 | A | 8/2000 | Kelada |
| 6,221,416 | B1 | 4/2001 | Nohren |
| 6,372,270 | B1 | 4/2002 | Denny |
| 6,394,312 | B1 | 5/2002 | Endou |
| 6,405,900 | B1 | 6/2002 | Kown |
| 6,409,099 | B1 | 6/2002 | Goodwin |
| 6,419,118 | B1 | 7/2002 | Rees |
| 6,423,224 | B1 | 7/2002 | Tanner |
| 6,428,689 | B1 | 8/2002 | Kameyama et al. |
| 6,461,498 | B2 | 10/2002 | Tseng |
| 6,478,192 | B2 | 11/2002 | Heyes |
| 6,482,823 | B1 | 11/2002 | Yu et al. |
| 6,513,337 | B1 | 2/2003 | Astvatsatrian et al. |
| 6,527,109 | B2 | 3/2003 | Schoo |
| 6,540,070 | B1 | 4/2003 | Conwell |
| 6,569,329 | B1 | 5/2003 | Nohren |
| 6,672,817 | B2 | 1/2004 | Denny |
| 6,759,072 | B1 | 7/2004 | Gutwein |
| 6,845,879 | B2 | 1/2005 | Park |
| 7,378,015 | B2 | 5/2008 | Rinker et al. |
| 2002/0011434 | A1 | 1/2002 | Kuennen et al. |
| 2002/0011437 | A1 | 1/2002 | Kaito et al. |
| 2002/0014461 | A1 | 2/2002 | Kuennen et al. |
| 2003/0042201 | A1 | 3/2003 | Sizelove et al. |
| 2003/0049352 | A1 | 3/2003 | Mehansho |
| 2003/0132167 | A1 | 7/2003 | Haase |
| 2003/0188740 | A1 | 10/2003 | Tribelsky et al. |
| 2003/0234212 | A1 | 12/2003 | Ito et al. |
| 2004/0055948 | A1 | 3/2004 | Blum et al. |
| 2004/0084096 | A1 | 5/2004 | Whaley |
| 2005/0145548 | A1 | 7/2005 | Rhoades |
| 2005/0258082 | A1 | 11/2005 | Lund et al. |
| 2006/0000851 | A1 | 1/2006 | Girard et al. |
| 2006/0016347 | A1 | 1/2006 | Girard et al. |
| 2006/0144244 | A1 | 7/2006 | Girard et al. |

FOREIGN PATENT DOCUMENTS

| | | |
|---|---|---|
| EP | 0077208 A1 | 4/1983 |
| EP | 0301672 A2 | 2/1989 |
| EP | 1161933 A2 | 12/2001 |
| EP | 1241110 A1 | 9/2002 |
| EP | 1310900 A2 | 5/2003 |
| JP | 3-182243 | 8/1991 |
| JP | 07290068 A | 11/1995 |
| WO | WO9601675 A1 | 1/1996 |
| WO | WO99/38395 A1 | 8/1999 |
| WO | WO0009448 A1 | 2/2000 |
| WO | WO03/022401 A2 | 3/2003 |
| WO | WO03/097478 A1 | 11/2003 |
| WO | WO200413047 A2 | 2/2004 |
| WO | WO2004026769 A1 | 4/2004 |

OTHER PUBLICATIONS

Nov. 17, 2010; Non-Final Office Action, U.S. Appl. No. 12/504,548.
Apr. 20, 2011, Final Office Action, U.S. Appl. No. 12/504,548.

* cited by examiner

910 — User squeezes bulb on dropper 5 times to dispense 5 drops of echinacea into outlet of water enhancement system 920 — User activates system to flow filtered water through outlet, mixing filtered water with Echinacea enhancement 930 — Enhanced filtered water flows into a container

FIG. 9

1010 User moves lever on input element to choose a dose of Vitamin C, thus sending enhancement delivery instructions 1020 Enhancement delivery element dispenses a dose of Vitamin C into outlet of water enhancement system 1030 User activates system to flow filtered water through outlet, mixing filtered water with Vitamin C enhancement 1040 Enhanced filtered water flows into a container

FIG. 10

| 1210 | User swipes ID card through card reader in input element |

| 1220 | User attaches blood pressure cuff and pushes button on input element to start blood pressure measurement, the value of which is stored in memory element when complete |

| 1230 | Logic element queries memory element for user's personal profile, blood pressure value, environmental data, enhancement program(s), user dispensing history, and enhancement inventory, and uses algorithm to determine useful enhancement(s) |

| 1240 | Recommendation for enhancements calcium (available) and magnesium (not available) are displayed on touch screen of communication element |

FIG. 12A

CONTROL SCHEME FOR ENHANCED FILTERED WATER SYSTEMS

CROSS-REFERENCE TO RELATED APPLICATIONS

This application is a continuation of U.S. application Ser. No. 12/720,069, filed Mar. 9, 2010, which is a continuation of U.S. application Ser. No. 11/015,395, filed Dec. 16, 2004, which is now U.S. Pat. No. 7,713,482, which claims priority to U.S. Provisional Application No. 60/531,004, filed Dec. 18, 2003.

BACKGROUND OF THE INVENTION

1. Field of the Invention

This invention relates generally to water filtration, and, more specifically, to control systems that add enhancements to filtered drinking water.

2. Description of the Related Art

Unwanted and potentially harmful contamination in water, especially drinking water, is of concern to many people. This concern creates a desire for water treatment devices in the home and elsewhere. Many water treatment devices and methods have been developed to remove or neutralize particulate and chemical contaminants.

Major categories of consumer water filtration systems include plumbed-in or faucet-mount systems that rely on the pressure of the water supply to force untreated water through a water treatment device; and non-plumbed, pour-though or batch systems that rely on gravity to move water from an upper influent water chamber, through a filtering means to a lower effluent water chamber. In general, most pour-through systems use water filters made of loose filtration media, as the force of gravity is not usually enough to push water through more compacted media. On the other hand, most faucet-mount systems filter water through porous composite blocks made from filtration media and binders. Water in faucet-mount systems is driven through filter blocks by pressure in the water supply line. Other water treatment systems that can use porous composite blocks include refrigerator systems and squeeze bottles.

People have greatly increased their consumption of filtered or processed water in recent years. Many people choose filtered water because they like the taste or because they believe it is a healthier option than tap or well water.

There is an increasing demand for dietary supplements, such as vitamins, minerals, and herbs, as part of maintaining overall health. It is desirable, as an outgrowth of water filtration, to offer enhancements to add to filtered water to support the health of consumers. Although enhancements can be purchased separately and added to filtered water, it is inconvenient to have to open a package or several packages to get the mix of enhancements desired. It is even more inconvenient to do this repeatedly for each serving of filtered water, requiring additional time and utensils. Furthermore, it is not very useful to mix up a large batch of filtered, enhanced water, as many enhancements change over time after mixing into water.

Accordingly, there is a need for improved devices and methods for adding enhancements to filtered water.

SUMMARY OF THE INVENTION

An enhancement control system that can be used as part of an enhanced water system to produce enhanced filtered water is disclosed. The enhancement control system includes at least one enhancement delivery element that can dispense an enhancement(s) into filtered water in response to an enhancement delivery instruction(s). The enhancement control system can also include an input element that can enable transmittal of the enhancement delivery instruction(s) from a user to the enhancement delivery element(s). The control system can also include a memory element that can store information about the user and the user's preferences and information about the enhanced water system. The control system can also include a communication element that can provide information from the enhanced water system to the user. The control system can also include a monitor element that can gather data from outside the enhanced water system, such as user health information or environmental information, and provide the data to the enhanced water system. In some embodiments, a control logic element can be used to coordinate and control operation of the elements of the enhanced water system.

BRIEF DESCRIPTION OF THE DRAWINGS

The foregoing aspects and others will be readily appreciated by the skilled artisan from the following description of illustrative embodiments when read in conjunction with the accompanying drawings.

FIG. 9 is a block diagram that outlines the steps for using a control system as discussed in Example 1.

FIG. 10 is a block diagram that outlines the steps for using a control system as discussed in Example 2.

FIG. 12A is a block diagram that outlines the first four steps for using a control system as discussed in Example 4.

DETAILED DESCRIPTION

Figure 1:
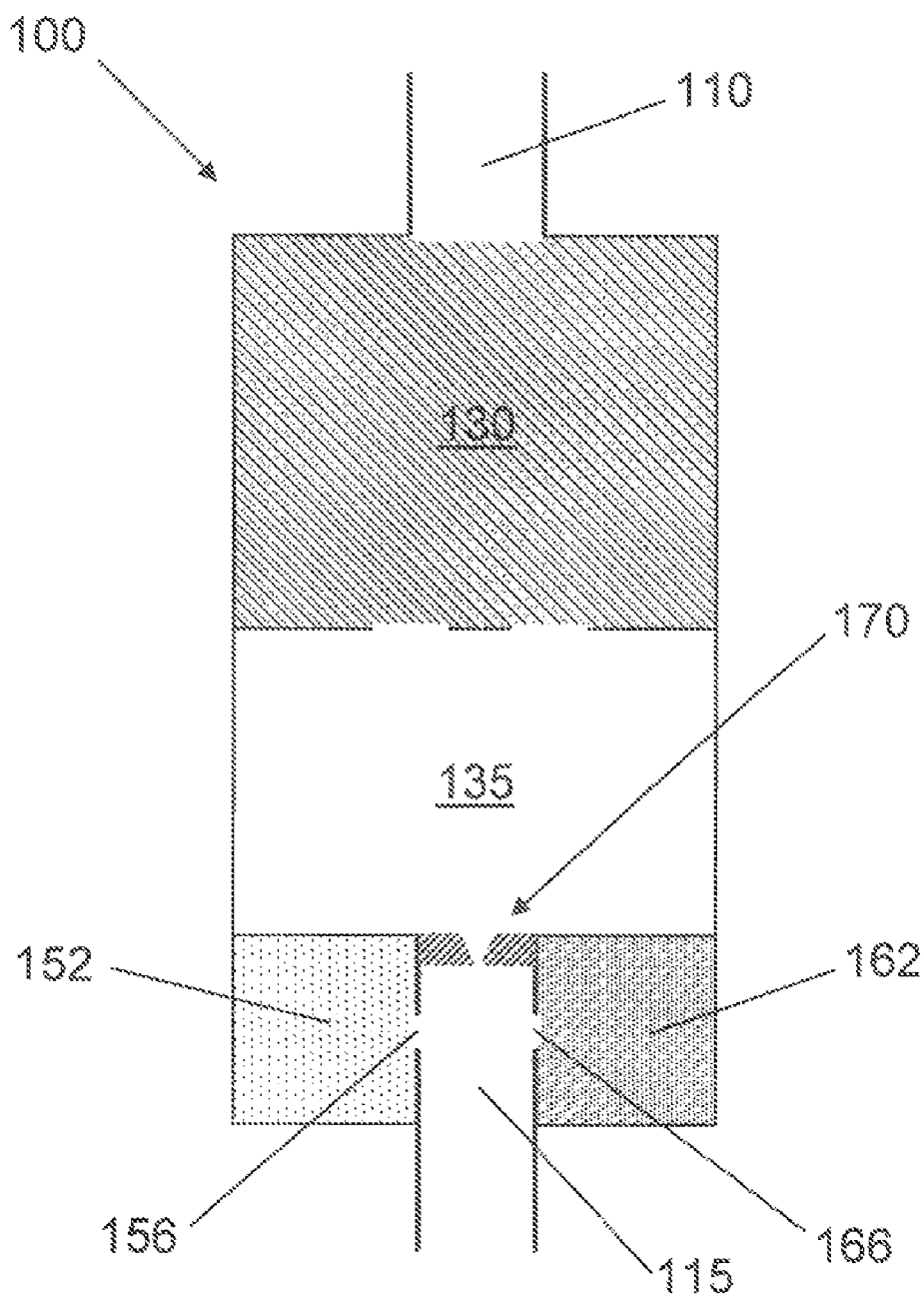
FIG. 1 is a schematic cross-section drawing of a water enhancement system that can both filter water and add enhancements to the filtered or treated water, according to an embodiment of the invention.

There are a number of reasons why health-minded people drink water regularly. Drinking water prevents dehydration, which is associated with fatigue and a variety of health concerns. Water can provide proper hydration, which aids digestion, supports removal of cell waste products, and contributes to skin and overall health. After exercise, water can replenish lost fluids. Many weight loss programs encourage drinking water as a no-calorie stomach filler. In general, water is a much healthier hydration choice than beverages that contain sugar, carbonation, or caffeine. Many people prefer not to drink tap water because of possible contaminants therein and because they do not like the taste. Some people choose filtered water in order to avoid ingestion of contaminants, such as lead and sulfur, and because they prefer the taste of water after filtration.

Many people like the idea of adding supplements or enhancements to their diets because they want to improve or maintain their health. Popular supplements include daily multi-vitamins, minerals, and herbs, which can supply benefits such as increased energy or increased immunity. One of the primary barriers to taking regular supplements is the inconvenience; it can be difficult to make the time to mix beverages or to remember to take pills as part of one's daily routine. It is more convenient when supplements or enhancements are included in beverages or foods that people are already ingesting every day. Examples include calcium-fortified orange juice, milk with added vitamin D, and vitamin-fortified breakfast cereal. But the enhancements are included in the orange juice, the milk and the cereal long before these products reach people's homes. It would be even more convenient if individual enhancements, tailored to individual needs or desires, could be added easily and at the point of use to liquids that people are already drinking every day, such as filtered water.

Household pets or other animals can also benefit from enhanced water, especially when the enhancement(s) has been tailored to their individual needs.

In one embodiment of the invention, enhancements can be dispensed as individual doses into servings of filtered water as the filtered water leaves a water treatment system. It is desirable to use simple water treatment systems to minimize cost and complexity to the consumer. Simple water treatment systems include systems through which water is driven by the force of gravity, by pressure in the source water line, and/or by hand pumps. The source water line is generally part of the plumbing in the house or building in which the water treatment system is used. Examples of simple water treatment systems include faucet mount systems, in-faucet systems, under-the-sink systems, countertop systems, refrigerator water systems, stand-alone filtration pitchers, water dispensers, and portable water bottles. Systems that require electric pumps to move water through them or that operate at pressures greater than 125 psi, or, in some arrangements, greater than 100 psi, are not considered to be simple water treatment systems for the purpose of this disclosure.

Not everyone needs or desires the same enhancements. In a situation where many people use the same enhanced water system, specific enhancement(s) can be chosen for each person. A number of enhancements can be stored as part of the water enhancement system and can be dispensed simply, as desired. One or several enhancements can be added to filtered water as it leaves the system. The terms "enhanced water system" and "water enhancement system" are used interchangeably throughout the disclosure to mean a system that can filter water and add enhancements to the filtered water.

The amount or dose of an enhancement can be selected for each individual serving. The dose can be adjusted based on the amount of treated water that is added to the enhancement. In some arrangements, the dose can be pre-selected and then dispensed with subsequent servings or enhanced filtered water. In other arrangements, the dose can be determined and dispensed as desired with each serving.

In some embodiments, enhancements are added to filtered water without adding any apparent taste, smell, or feel, that is, the enhancements are organoleptically acceptable. The aesthetic of enhanced water can be indistinguishable from that of filtered water. Health-related enhancements include minerals, vitamins, herbal supplements, nutritional supplements, phytonutrients, probiotics, homeopathic remedies, amino acids, enzymes, hormones, standard prescription medications and over-the-counter medications. Examples of some enhancements are given in Table 1. Enhancements are most useful when they are in forms that have high bioavailability, that is, forms that are easily absorbed and used by the body.

TABLE 1

| Health-Related Enhancements | |
|---|---|
| minerals | calcium, magnesium, iron, zinc, manganese, copper, chromium, selenium, molybdenum, vanadium, potassium, iodine, pentathionic acid, boron |
| vitamins | vitamin A, vitamin B2, vitamin B6, vitamin B12, vitamin C, vitamin E, niacin, thiamin, omega-3, omega-6, omega-9 fatty acids, folic acid |
| herbal supplements | echinacea, primrose oil, ginseng, ginko, gentian, comfrey, garlic, calendula, brewer's yeast, fenugreek, licorice root, juniper berry, wild yam root, ginger root, goldenseal root, poke root, St. John's wort, mullein, saw palmetto |
| phytonutrients | chlorella, spirulina |
| probiotics | *lactobacillus acidophilus, bifobacterium bifidium* |
| homoepathic remedies | *arnica montana, aconitum napellus, bryonia alba, cantharis, cocculus indicus, dulcamara, gelsemium sempervirens, ignatia amara, ledum palustre, mezereum, nux vomica,* silicea, *thuja occidentalis* |
| amino acids | histidine, isoleucine, leucine, lysine, methionine, cysteine, phenylalanine, tyrosine, threonine, tryptophan, valine |
| enzymes | pancreatin, bromelain, protease, lipase, amylase, pancrelipase, papain, pepsin, diatase, cellulase |

In other embodiments, it can be advantageous to make secondary aesthetic changes to the enhanced filtered water. Aesthetic enhancements include coloring agents, such as FD&C dyes and FD&C lake dyes; flavoring agents, such as natural and artificial fruit and botanical flavors, fruit juices, and other well-known flavoring agents, such as chocolate and vanilla; edible acids, such as tannic acid, malic acid, tartaric acid, citric acid, phosphoric acid, acetic acid, lactic acid, and maleic acid; natural and artificial sweeteners; and antioxidants, such as butylated hydroxyanisole (BHA) and butylated hydroxytouene (BHT). In some arrangements, the secondary aesthetic enhancements can be used to mask an unpleasant organoleptic change caused by a primary health-related enhancement. In some arrangements, secondary aesthetic enhancements can be used in addition to primary health-related enhancements, even when the health-related enhancement has caused no unpleasant organoleptic change, for example, as a taste or visual indicator that a particular health-related enhancement has also been added. In one example, an orange color is added to filtered water that has been enhanced with Vitamin C. In other arrangements, aesthetic enhancements can be used by themselves when only a subtle aesthetic change to filtered water is desired. In general, aesthetic enhancements are secondary and are not used for the purpose of producing a flavored beverage that contains no benefits other than the flavor. Secondary aesthetic enhancements are added to mask unpleasant flavors caused by health-related primary enhancements, or in concert with a primary health-related enhancement to act as a marker for the primary enhancement, or to add very subtle flavors to increase a user's enjoyment of drinking filtered water.

In some embodiments, enhancements can be added to filtered water to make enhanced water that has an optimal composition of minerals and microelements. The types and amounts of enhancements added to the filtered water to achieve the optimal composition depends on the composition of the filtered water before enhancement. The composition of the filtered water depends on the composition of the source water and can vary from one geographic region to another. A suggested optimal composition for enhanced water is listed in Table 2.

TABLE 2

| Mineral component | Concentration mg/dm$^3$ | Mineral component | Concentration mg/dm$^3$ |
|---|---|---|---|
| $HCO_3^-$ | 357 | $Mn^{2+}$ | 0.016 |
| $SO_4^{2-}$ | 10.56 | $F^-$ | 0.3 |
| $Cl^-$ | 2.2 | $I^-$ | 0.05 |
| $Na^+$ | 5.5 | $Zn^{2+}$ | 2.0 |
| $K^+$ | 0.75 | $Cu^{2+}$ | 0.3 |
| $Ca^{2+}$ | 78 | $Cr^{3+}$ | 0.02 |
| $Mg^{2+}$ | 23 | $Mo (MoO_4^{2-})$ | 0.02 |
| $Fe^{2+}$ | 0.06 | $Se (SeO_4^{2-})$ | 0.014 |

In one embodiment, enhancements are used to make enhanced water to drink with a meal to intensify the flavor of the food. Enhancements such as glutamic acid, guanylic acid, disodium guanylate, inosinic acid, and disodium inosinate are known to be flavor enhancers. In one embodiment, enhancements are used to make enhanced water that can accelerate the onset of satiety. The enhanced water can be consumed before or during a meal to help with weight control. Enhancements such as glycomacropeptides are known to accelerate satiety.

After they are mixed with water, some enhancements, such as vitamin C, vitamin B, and iron, can degrade over time. The enhancements can lose their potency or they can lose their effectiveness altogether. If the enhanced water is ingested very soon after the enhancement is added, benefits from the enhancement can be realized without concern about degradation.

Enhancements can be in the form of liquids, powders, microcapsules, nanocapsules, nebulized nanoparticles, nanoemulsions, micelles, gases, and combinations thereof. In some arrangements, the enhancements are contained in a refillable reservoir. In other arrangements, the enhancements are contained in a disposable cartridge.

In one embodiment, the enhanced water systems described herein use source water that is either at room temperature or colder. In another embodiment of the invention, the source water can have a temperature no higher than about 40° C. (105° F.) In yet another embodiment, the source water can have a temperature no higher than about 50° C. (120° F.). In general, the source water and filtered water in the enhanced water system do not undergo a heating step as is required for brewing beverages such as coffee or tea. Furthermore, many of the enhancements described herein can be denatured or deactivated by exposure to high temperatures. Combining heat-sensitive enhancements with high temperature water can reduce the health benefits of the enhanced water.

The amounts of enhancements which are added into the filtered water to make enhanced filtered water are very small. Of course, the amount or dose recommended can vary with each enhancement. Table 3 shows the recommended daily allowances (RDAs) of vitamins and minerals for adults and children more than four years of age. The total amount of vitamins and minerals in the RDA is about 2550 mg or 2.55 g. Eight ounces of filtered water weighs about 240 g. The weight proportion of the total RDA in an eight ounce serving of enhanced filtered water is about 1 wt % (weight percent). Many more enhancements may be added to a serving (8 ounces) of filtered water without greatly increasing the weight proportion contributed to the enhanced water by the enhancements. In some arrangements, the weight proportion of enhancements is no more than about 5 wt % of the enhanced water. In other arrangements, the weight proportion of enhancements is no more than about 3 wt % of the enhanced water. In yet other arrangements, the weight proportion of enhancements is no more than about 1.5 wt % of the enhanced water.

TABLE 3

U.S. Recommended Daily Allowances, U.S. RDAs, for Adults and Children 4 or more Years of Age

| Nutrient | Other Names & Usual Forms in Supplements | Amount of 100% U.S. RDA |
|---|---|---|
| Vitamin A | Vitamin A acetate; Beta-carotene | 18 mg |
| Vitamin D | Vitamin D; Cholecalciferol | 10 μg |
| Vitamin E | Alpha tocopherol acetate | 20 μg |
| Vitamin C | Ascorbic acid; Niacinamide ascorbate | 60 mg |
| Folic acid | Folacin | 400 μg |
| Thiamine | Vitamin B-1; Thiamin; Thiamine mononitrate | 1.5 mg |
| Riboflavin | Vitamin B-2 | 1.7 mg |
| Niacin | Niacinamide; Niacinamide ascorbate | 20 mg |
| Vitamin B-6 | Pyridoxine hydrochloride | 2.0 mg |
| Vitamin B-12 | Cyanocobalamin | 6.0 μg |
| Biotin | Biotin | 0.3 mg |
| Pantothenic acid | Calcium pantothenate | 10 mg |
| Calcium | Dibasic calcium phosphate; Elemental calcium | 1000 mg |
| Phosphorus | Dibasic calcium phosphate | 1000 mg |
| Iodine | Potassium iodide | 150 μg |
| Iron | Ferrous fumarate; Ferrous sulfate; Elemental iron | 18 mg |
| Magnesium | Magnesium oxide; Magnesium sulfate | 400 mg |
| Copper | Cupric oxide; Cupric sulfate | 2.0 mg |
| Zinc | Zinc oxide | 15 mg |

FIG. 1 is a schematic cross-section drawing of a water enhancement system 100 that can both filter water and add enhancements to the filtered or treated water, according to an embodiment of the invention. The water enhancement system 100 includes an inlet 110 for source water. The inlet 110 is in fluid communication with a water filter device 130. Source water can flow from the inlet 110 along any of a number of fluid paths through water treatment material within the filter device 130, thus becoming treated water. Possible water treatment materials include activated carbon, carbonized synthetic materials, hydrophobic polymeric adsorbents, activated alumina, activated bauxite, fuller's earth, diatomaceous earth, silica gel, calcium sulfate, zeolite particles, inert particles, sand, surface charge-modified particles, ceramic particles, metal oxides, metal hydroxides, and combinations thereof. The treated water can flow from the filter device 130 into an outlet 115. In some embodiments, the treated water flows from the filter device 130 into a treated water container 135, where the treated water can be held for some time before being allowed to flow into the outlet 115.

A first enhancement 152 can be added to the treated water in the outlet 115 through a first dispensing unit 156. In some arrangements, a second enhancement 162 can be added to the treated water in the outlet 115 through a second dispensing unit 166. In other arrangements (not shown), there can be any number of enhancements added to the treated water. As enhancement(s) 152, 162 are added, the treated water becomes enhanced water. The enhanced water can continue flowing through the outlet 115 to a point of use, such as a cup, a bottle, or even directly into a consumer's mouth.

In some arrangements, there is a valve 170 that can prevent enhanced water in the outlet 115 from moving back toward the filter device 130 or back into the optional treated water container 135. The valve 170 can be a simple mechanical check valve or flap valve. In other arrangements, the valve 170 can be electrically powered, for example, by a battery.

In some arrangements, the outlet 115 can include a mixing chamber (not shown) where the enhanced water can be mixed, perhaps with an agitation tool that has a geometry that can create turbulence, such as a rotor, baffle, screw, or auger, before continuing to flow out through the outlet 115 to a point of use. In some arrangements, the agitation tool can be driven solely by the flow of the water. In other arrangements, the agitation tool can be driven by changing the position of the system 100 or by a spring mechanism. In yet other arrangements, the agitation tool can be electrically powered, such as by a battery.

In some embodiments, no electric pumps are used to pump water through the water enhancement system 100 shown in FIG. 1. In some embodiments, source water comes directly from a faucet. The source water is subject to the pressure that results from pumping within a city water system and/or additional pumping systems within a building before the source water reaches the faucet. In other embodiments, there is an inlet water container, as will be discussed below, in which source water can be held before it flows into the filter device 120 under the force of gravity alone.

Figure 2:
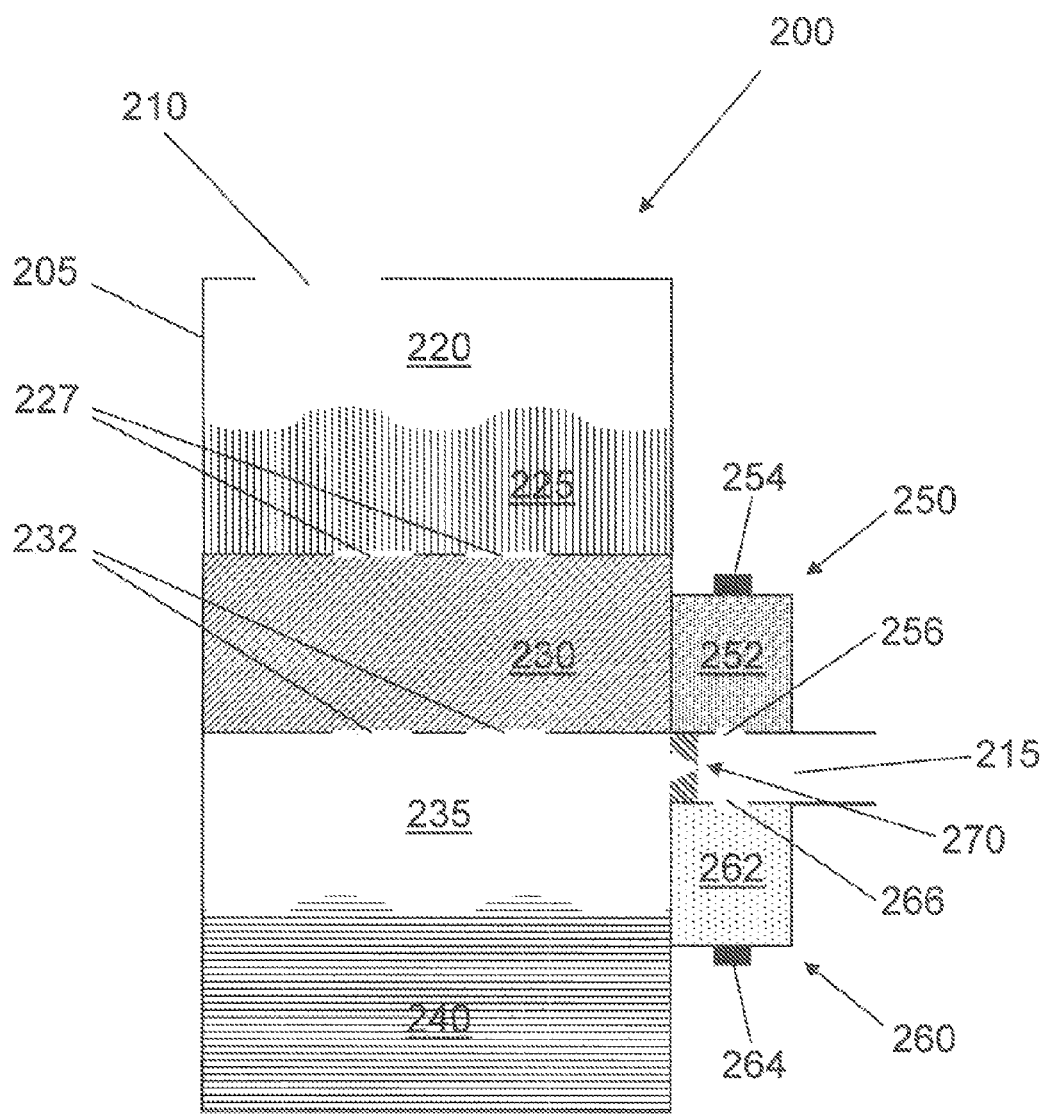
FIG. 2 is a schematic, cross-section drawing of a flow-through or gravity-flow water enhancement system, according to an embodiment of the invention.

FIG. 2 is a schematic, cross-section drawing of a flow-through or gravity-flow water enhancement system 200, according to an embodiment of the invention. No electric pumps are used to move water through the water enhancement system 200. The water enhancement system 200 has a housing 205, which has an inlet 210 and an outlet 215. The inlet 210 opens into a source water container 220. In FIG. 2, the source water container 220 holds a quantity of source water 225, which has been introduced into the source water container 220 through the inlet 210. The source water 225 has fluid communication with a filter component 230 through openings 227. The source water 225 can flow through the filter component 230, thus becoming treated water, and into treated water container 235 through openings 232. In FIG. 2, the treated water container 235 holds a quantity of treated water 240. The outlet 215 can be in fluid communication with the treated water container 235. By adjusting the position of the water enhancement system 200, the treated water 240 can flow into the outlet 215.

Adjacent the outlet 215 is a first enhancement module 250, which contains a first enhancement 252. By activating first consumer control 254, the first enhancement 252 can be dispensed into the outlet 215 through first dispensing unit 256. The first consumer control 254 can be a button, a knob, a dial, a lever, an airbladder, a slide, a catch, a wheel, or combinations thereof.

In FIG. 2, there is a second enhancement module 260 that contains a second enhancement 262 adjacent the outlet 215. By activating second consumer control 264, the second enhancement 262 can be dispensed into the outlet 215 through second dispensing unit 266. The second consumer control 264 can be a button, a knob, a dial, a lever, an airbladder, a slide, a catch, a wheel, or combinations thereof. Although there are only two enhancement modules 250, 260 shown in FIG. 2, any number of enhancement modules can be used in the embodiments of the invention.

In some arrangements, there is a valve 270 that can prevent enhanced water in the outlet 215 from moving back into the treated water container 235. The valve 270 can be a simple mechanical check valve or flap valve. In other arrangements, the valve 270 can be electrically powered, for example, by a battery. The valve 270 prevents mixing of enhanced water with treated water 240 in the treated water container 235. In some arrangements, the outlet 215 can include a mixing chamber, as is discussed below, where the enhanced water can be mixed before flowing out through the outlet 215 to a point use.

The amount or dose of an enhancement can be selected for each individual serving. The dose can be adjusted based on the amount of enhancement desired and on the amount of treated water that is added to the enhancement, i.e., the serving size. In some arrangements, a measured dose can be selected and dispensed as desired with each serving. In other arrangements, a measured dose can be pre-selected and then automatically dispensed with subsequent servings. Input elements such as the consumer controls 254, 256 shown in FIG. 2 can be used to initiate release of an enhancement into filtered water.

Further details of enhanced water systems have been described by Rinker et al. in U.S. patent application Ser. No. 10/825,344, filed Apr. 15, 2004, hereby incorporated herein by reference.

An enhancement control system can provide consumers or users with an accurate, safe, and easy way to add and track enhancement additions to filtered drinking water. Such systems can be simple or complex.

Complex systems can include features such as control, system feedback, system reset, user-controlled dose delivery cancellation, dose counting, delayed dose delivery, prompts to refill enhancement reservoirs, enhancement delivery programs for individual users, computer control, logic functions to suggest useful enhancements, and health and environmental monitors, any or all of which may be powered electrically, using either batteries or line power.

Figure 3:
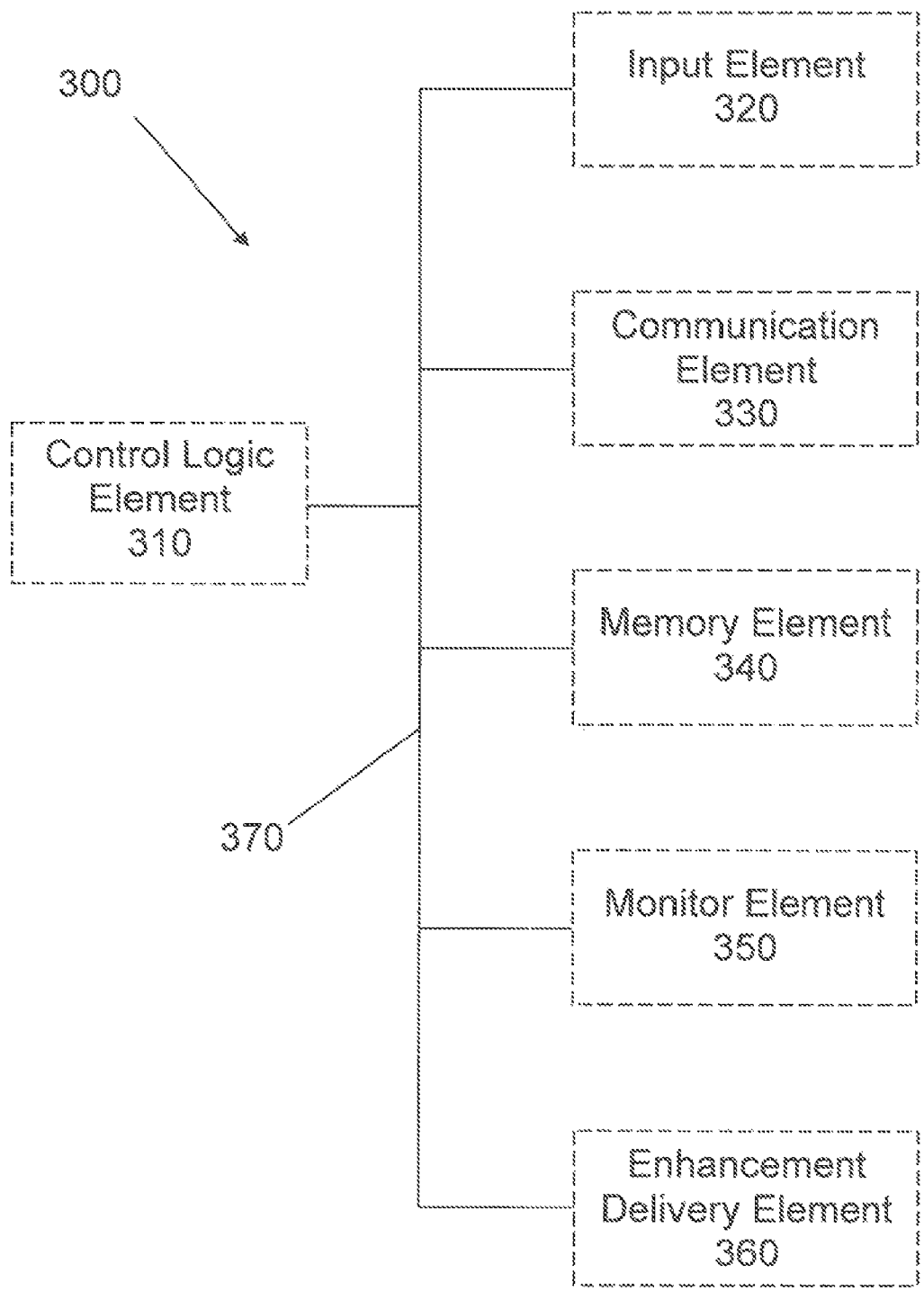
FIG. 3 is a block diagram that shows an exemplary embodiment of an enhancement control system.

FIG. 3 is a block diagram that shows an exemplary embodiment of an enhancement control system 300. Components include a control logic element 310, an input element 320, a communication element 330, a memory element 340, a monitor element 350, and an enhancement delivery element 360. Enhancement control systems can include some or all of the components shown in FIG. 3. There can be one or more of each element. Many of the components can also include sub-elements, as will be discussed further below. Enhancement control systems can also include additional components not shown in FIG. 3 to customize an enhanced water system for specific uses. Each of the elements can send and receive signals or information from the other components. In some arrangements, the elements can send and receive signals through a bus 370.

Input Element

The input element 320 provides a user interface to the enhancement control system 300. A user can perform various functions through the input element 320. The user can activate the input element 320 to produce a signal that can enable transmittal of enhancement delivery instructions to the enhancement delivery element 360. In one arrangement, the input signal contains the enhancement delivery instructions directly to the enhancement delivery element 360, which can dispense an enhancement into the filtered water. In other arrangements, the input signal invokes the enhancement delivery instructions from a memory element 340. After the enhancement delivery instructions are called up from the memory element 340, the instructions can be sent on to the enhancement delivery element 360, which can dispense an enhancement into the filtered water.

Figure 4:
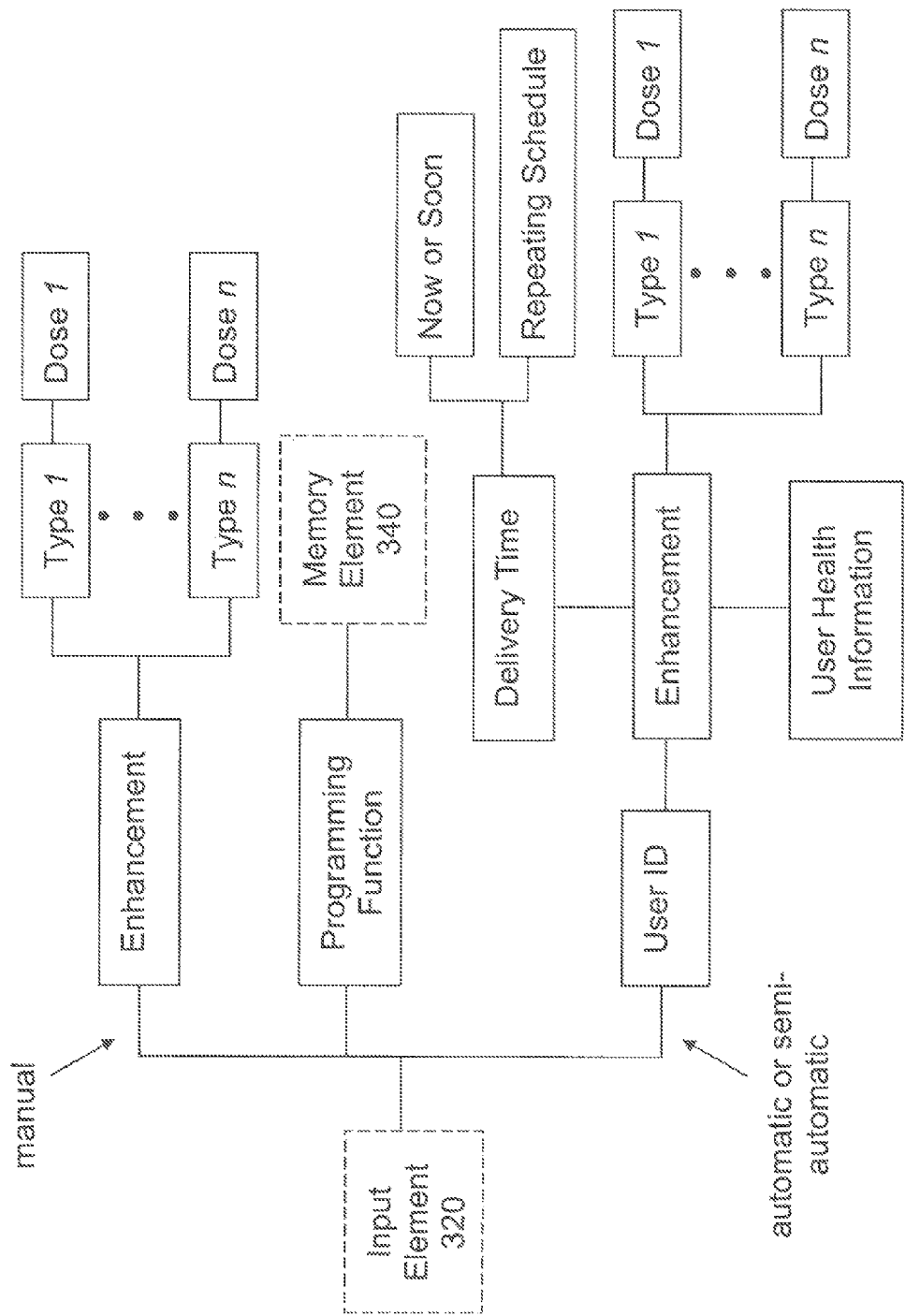
FIG. 4 is a block diagram that shows an exemplary embodiment of components that can be included as part of the input element.

Some exemplary components of the input element 320 are shown in the illustrated embodiment in FIG. 4. The input element 320 can be used manually as indicated in the upper portion of FIG. 4 or the input element 320 can operate automatically or semi-automatically to activate programs specific to an individual as shown in the lower portion of FIG. 4.

To operate the enhancement control system 300 manually, a user can choose one or more enhancements, Type 1 through Type n, and a specific dose, Dose 1 through Dose n, respectively, for each type of enhancement. The enhancement(s) can be dispensed at once to mix with filtered water as the water exits the filtered water system.

To operate the enhancement control system 300 automatically or semi-automatically, a user can enter an identification code or representation through the input element. Suitable ways of identifying the user include, but are not limited to, personal identification number (PIN), name, pass code, and the like, which can be communicated to the enhancement control system 300 via an input device or process, such as a keypad, touch screen, matrix card, retinal scanner, thumb-print reader, magnetic card reader, bar code, or radio frequency identification tag (RFID), and the like.

A user can establish a personal profile through the input element 320, which is stored in the memory element 340 of the control system 300. Information about the user, the user's general health, the user's enhancement preferences, and the user's predetermined programs of enhancements can be stored as part of the personal profile. In some arrangements, the enhancement control system 300 can pose a few simple questions about preferences to the user to aid in the formation of the personal profile. The user's enhancement preferences can include information about regularly used enhancements, Type 1 through Type n, and specific doses, Dose 1 through Dose n, respectively, for each type of enhancement. In one arrangement, the user can specify an enhancement or enhancements to be delivered now or soon.

In one embodiment the input element 320 can include a programming function to enter a set of executable instructions such as software, routines, programs, algorithms, code, logic and the like, which help the user to follow a long-term regime or program of enhanced filtered water. Particular enhancement doses or particular types are set to be dispensed on a repeating schedule at predetermined times, such as at mealtimes or at specified intervals. The programs can be stored in the memory element 340 of the enhancement control system 300.

The programs can be invoked upon identification of the user, and any enhancement due to be dispensed can be dispensed at once. Time criteria can be set with rules to determine when an enhancement delivery is considered "due" or "overdue". The rules can include criteria to determine whether an overdue dose is dispensed at once or whether an overdue dose is omitted, and the schedule can be continued with the next scheduled dose.

In another arrangement, a user can indicate through the input element 320 a particular physical symptom (e.g., headache, fever), or a generalized feeling of discomfort (e.g., lethargy, inability to concentrate) and ask the enhancement control system 300 for suggestions for enhancements that might help alleviate the symptoms or discomfort. A user can also indicate an anticipated activity (e.g., exercising, sleeping) and ask for suggestions for enhancements that might help to accomplish that activity. Suggestions can be communicated to the user through the communication element 330.

After a serving of enhanced, filtered water has been dispensed, a reset function can return the input element 320 to a state in which it is ready to be activated again. The reset function can operate manually and/or automatically. The input element 320 can have a child-proof feature or a lock-out feature to prevent unauthorized use.

The input element 320 can include a user interface that is mechanical, electrical, sonic, optical, magnetic, electromagnetic, or combinations thereof. The mechanism(s) can be operated locally or remotely. Suitable ways to communicate with the enhancement control system 300 through the input element 320 can also include voice, keyboard, mouse, touch screen, remote control, and means such as selectors, slide bars, buttons, switches, squeeze bulbs, levers, dials, and pressure sensing devices.

The input signal can include information, such as user identity, personal profile, enhancement preferences, physical symptoms, anticipated physical needs, sets of executable instructions, and programs for enhancement delivery.

Communication Element

The communication element 330 can inform a user of a variety of conditions in the enhanced water system, that is, the status of the enhanced water system. In some arrangements, the communication occurs through a simple mechanical device, such as by movement of a button, bar, or dial, which can be seen through a window. In other arrangements, the message can be audible or visual. Audible means include simple sounds; different sounds can have different meanings. Audible means can also include synthesized speech that recites verbal messages describing various conditions. In some arrangements, visual means can include one or more lights; lights can be labeled with words or symbols, or different colored lights can be understood to have different meanings. In other arrangements, a visual display, that includes text and/or pictures can be used, such as LED, OLED, or LCD screens.

In some arrangements, feedback can be solicited by the enhancement control system 300. In one embodiment, the communication element 330 can receive input from the user in addition to providing information to the user. An example of a communication element 330 that can also receive input is a touch screen that displays choices that a user can make by touching discreet regions on the touch screen. Suitable ways of communicating with the user include voice, keyboard, touch screen, and conventional means such as selectors, slide bars, buttons, and switches. By understanding what individual users desire through their responses to certain key questions, the enhancement control system 300 can optimize delivery of enhancements for each user either through modifying preset programs or suggesting one-time or long-term programs of enhancement doses.

In one embodiment, the communication element 330 can also prompt the user to enter feedback on previous enhancement deliveries, and the control system 300 can use that information to suggest modifications for the next enhancement delivery. Feedback can include information such as the user's response to previous enhancements. The communication element 330 may also present one or more suggested enhancement options to the user. The options can be based upon input from the feedback and/or the monitor element 350.

Figure 5:
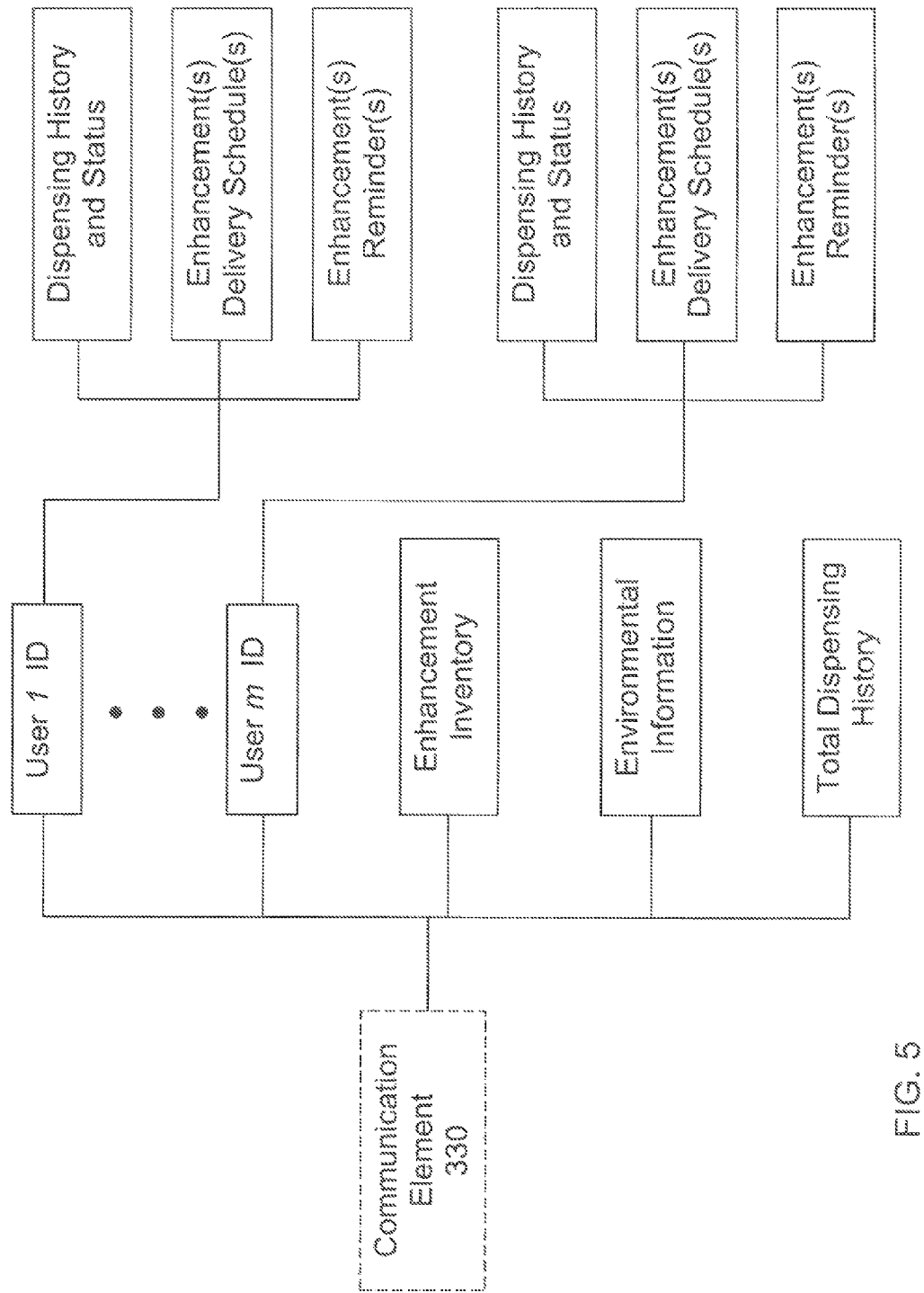
FIG. 5 is a block diagram that shows an exemplary embodiment of the information that can be accessed in the communication element.

FIG. 5 is a block diagram that shows some of the information or data that can be included in the communication element 330. The communication element 330 can provide information about the enhancement inventory, such as the supply level of each enhancement in the enhancement control system 300, reminders to refill empty or nearly empty supplies, and expiration dates of enhancement materials. In some arrangements, the communication element 330 can also provide information about the water filtration part of the enhanced water system, such as the length of time left or remaining filtration capacity of the water filter in the enhanced water system or a reminder to change the filter. The communication element 330 can provide records of previously requested and dispensed enhancements and may include the user associated with each (dispensing history), enhancements that are scheduled to be dispensed and the dose and user associated with each (dispensing status), recurring schedule times (enhancement delivery schedules), reminders to drink filtered water with particular enhancements, environmental information, health information, and user identity. For systems that include an environmental monitor as part of a monitor element 350, the communication element 330 can provide current or past environmental information.

The communication element 330 can include information about the type of enhancement and dose amount selected and the user who has made the selection. If a series of enhancements or a time delay before dispensing of an enhancement has been chosen, the communication element 330 can indicate details about the program, such as when the next dose is scheduled to be dispensed, or a listing of the dispensing instructions. In some arrangements, the communication element 330 can provide an additional indication to confirm that an enhancement has been dispensed. As a safety feature, the communication element 330 can include non-compliance indicators when an unexpectedly large dose of an enhancement is chosen, when a particular user chooses an unexpectedly large number of enhancements, when a user chooses an unexpectedly short time interval between enhancement doses, or when a user chooses an enhancement that is not recommended for him/her. The communication element 330 can provide any information that is available to the enhancement control system 300 from any element(s) of the enhancement control system 300.

Enhancement dose information can be displayed in a variety of ways. One example is the number of doses and the size of each dose dispensed per day for each enhancement. Other examples include the percent US recommended daily amount (% RDA) or total milligrams. Overdosing and near overdosing conditions according to preset criteria can be reported. In some arrangements, enhancement dispensing can be prevented if ingesting the enhancement would result in an overdose to the user.

In some arrangements, the communication element 330 can provide information about faults or errors within the enhancement control system 300, including power supply information. The communication element 330 can provide information that has been entered through the input element 320, the communication element 330 and any information that is stored in the memory element 340.

The communication element 330 can be reset manually and/or automatically, such as after a predetermined period. Resetting can return the communication element 330 to a neutral state ready to communicate new information.

The system of Claim minus 1 wherein the information comprises information entered into the input element and information stored in a memory element of the enhanced water system.

Memory Element

The memory element 340 can store information and records such as user health information, enhancement delivery programs, timing of enhancement delivery, repetition of enhancement delivery, enhancement delivery status, dispensing history including types and amounts of enhancements, and types and amounts of enhancements set to be dispensed at a later time. These data can be stored for each user and for the enhanced water system overall. The memory element 340 can also store non-user specific information such as environmental information, amounts of enhancement supplies, expiration dates of enhancement supplies, total dispensing history and status, and algorithms for the control logic element 310. Devices that can perform the functions of the memory element 340 include examples such as EEPROM, RAM, ROM, flash memory, bubble memory, and magnetic memory devices. All information that can be displayed by the communication element 330, as described above, can be stored in the memory element 340. The memory element 340 can store any information that is available to the enhancement control system 300.

Figure 6:
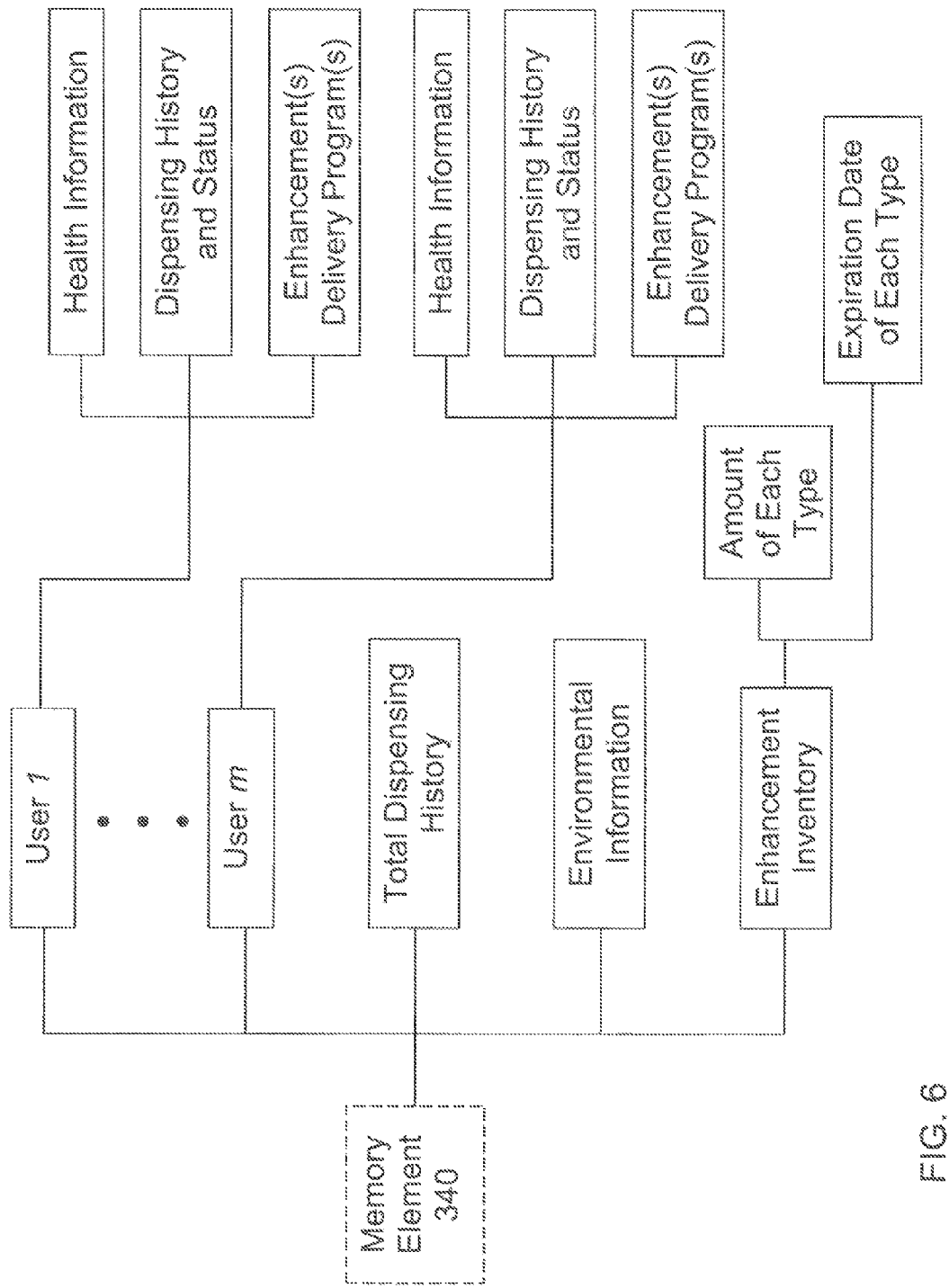
FIG. 6 is a block diagram that illustrates some of the information that can be stored in the memory element.

FIG. 6 is a block diagram that illustrates some of the information that can be stored in the memory element 340. The memory element 340 can store information such as health information, dispensing history and status, and enhancement delivery program(s) for a number, m, of individual users. The memory element 340 can store the total dispensing history of the enhancement control system 300 over a specified period. The memory element 340 can store information about enhancement inventories. The inventory information can include the amount remaining of each type of enhancement in the enhancement delivery element 360 and the expiration date for each enhancement.

The user enhancement history can be queried by the control logic element 310 as a safety feature to alert a user to a non-compliance condition. Examples of non-compliance conditions include unexpectedly large doses, unexpectedly large numbers of enhancements, and unexpectedly short time intervals between enhancement doses.

The memory element 340 can record and save information about the number of doses and the amount of enhancement in each dose dispensed from an enhancement supply. When an enhancement is refilled, the memory element 340 can record the type and amount of the enhancement supply and begin tracking the use of the enhancement to know when to send a low supply message. The memory element 340 can also track water filter life and send a signal to the communication element 320 when it is time to change the water filter. Water filter life can be determined by the length of time the filter has been in the enhanced water system or, in enhanced water systems with water flow sensors, by the amount of water that has passed through the filter.

A computer readable medium containing instructions for controlling an enhanced water system can be stored in the memory element 340 and used as part of the control system 300 for the enhanced water system to produce servings of enhanced filtered water Monitor Element A monitor element 350 that can measure outside parameters, especially those that can be used in adjusting enhancement programs can be incorporated into an enhancement control system 300 for an enhanced water system. Examples of useful monitor elements 350 are user health monitors and environmental monitors. Information collected by the monitor element(s) 350 can be used to adjust enhancement programs based on preset criteria.

Often even slight dehydration can affect energy level, muscle function, and mental acuity. Dehydration can become a chronic health issue for many people who cannot perceive the change or cannot link the symptoms to the cause. Many people are also affected by imbalances in minerals such as sodium, potassium, calcium, magnesium, zinc and iron. People may not be aware of imbalances unless their body fluids are tested.

Figure 7:
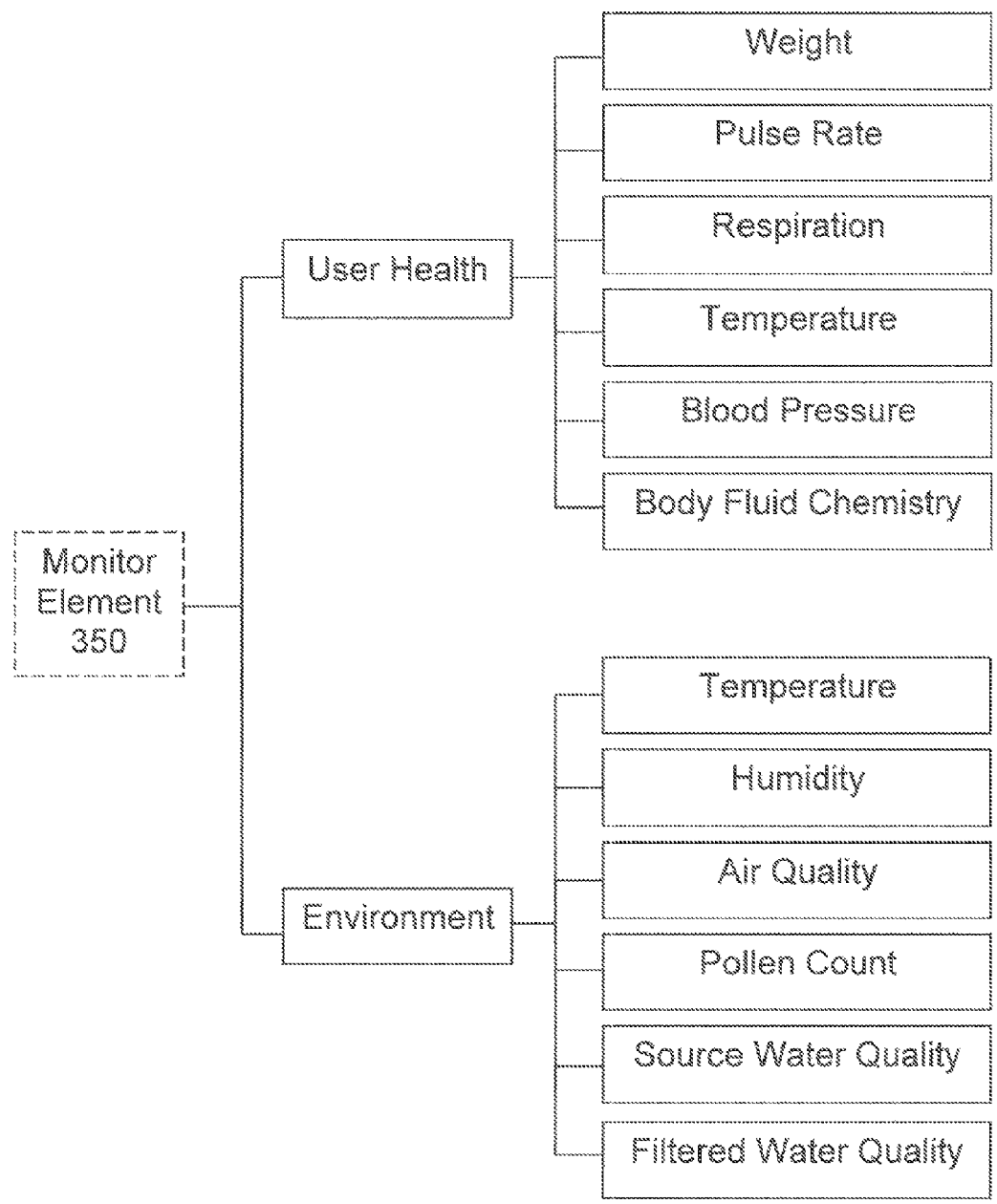
FIG. 7 is a block diagram that illustrates some of the parameters that can be measured by the monitor element.

As shown in FIG. 7, various health parameters of interest can be tracked within the enhancement control system 300. As used herein, the term "health parameters" refers broadly to results of tests of body functions (pulse, blood pressure, respiration rate and volume, temperature, etc.), tests of body fluids (blood, urine, saliva, breath, intra-tissue fluid, etc.) and weight. In some arrangements, the health monitor element can measure the chemical composition of a body fluid sample (e.g., water, minerals, enzymes, hormones, glucose, cholesterol, protein, carbohydrate, alcohol, etc.).

Measurements can be performed using noninvasive and invasive techniques, including vacuum electrodes, ultrasonic and radiographic methods. Users are more likely to use the least obtrusive and quickest techniques. Users could use the enhancement control system 300 to monitor nutritional conditions related to food and beverage intake, such as cholesterol, protein, carbohydrate, and alcohol levels. The health monitor element can help a user to enhance his/her filtered water based on objective health needs without having to guess which enhancements would be most useful.

In some arrangements, the user requests a specific test or monitor. In other arrangements, regular testing is part of the individual user's enhancement program. A test reminder is communicated to the user through the communication element 330.

A user's baseline health information can be stored in the memory element 340 as part of a personal profile. A user can use the health monitor element to see how his/her current health condition compares with the baseline. If there is a variance between current and baseline health conditions, the enhancement control system 300 can invoke algorithms to suggest enhancements that would be useful in restoring baseline health. Through the communication element 330, the user can choose to prepare filtered water that contains an enhancement based on the recommendation.

In one embodiment, the health monitor element can send and receive health information or data to and from a health practitioner for more in-depth, real time health advice and diagnosis. The information can be transmitted through phone, fax or computer data lines (such as over the internet).

Environmental parameters of interest include temperature, humidity, air quality (e.g., levels of pollutants, $SO_x$, $NO_x$, pollen, smoke, allergens, mold, dust, etc.) source water quality, and filtered water quality. Within a user's baseline health information there can be information on how the user's health is affected by changes in the environment. The enhancement control system 300 can make recommendations for enhancements that may mitigate anticipated consumer health responses based on preset criteria.

In another arrangement, the monitor element can receive information or data wirelessly from remote systems within a user's home, such as a climate control system. In yet another arrangement, the monitor element can receive information from a computer that is connected to the internet to provide environmental or other information from sources that are even more remote. In one arrangement, recent health information from the user's medical history, such as records as the office of the user's doctor, can be accessed.

Enhancement Delivery

The enhancement delivery element 360 includes storage for at least one enhancement and at least one enhancement dispenser. The enhancement delivery element 360 receives dispensing instructions that have been initiated from the input element 320 and sent to the enhancement delivery element 360, either directly or indirectly. The instructions may be specified to the input element 320 by a user in real time. The instructions may have been initiated from the input element 320 at an earlier time and stored in the memory element 340 for use when desired. The instructions may have been initiated from the input element 320 and modified by the control logic element 310 due to information received from the communication element 330, the monitor element(s) 350, and/or the memory element 350.

Figure 8A:
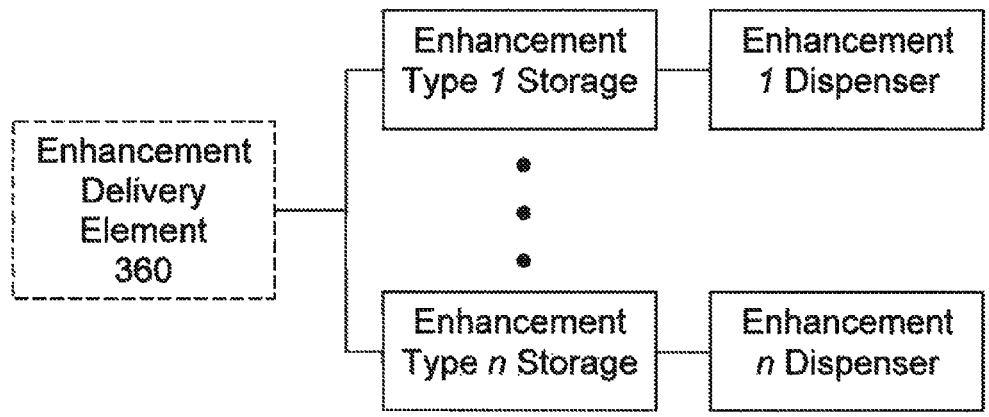
FIG. 8A is a block drawing that shows one possible arrangement for an enhancement delivery element.
Figure 8B:
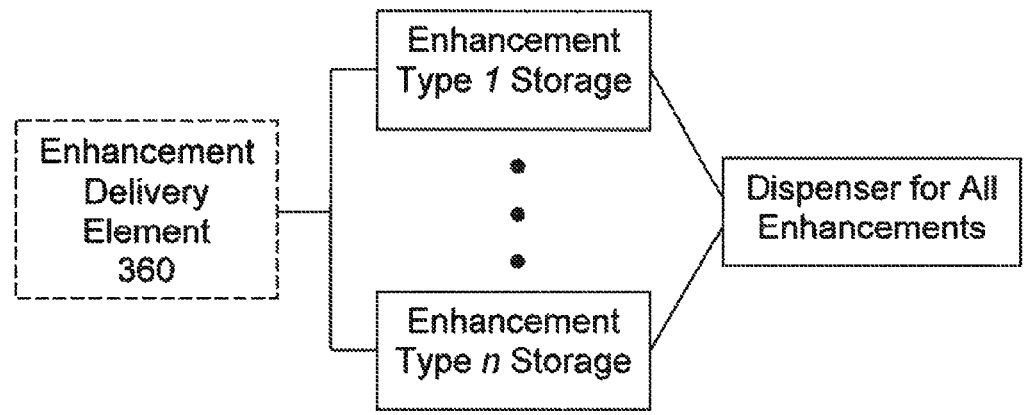
FIG. 8B is a block drawing that shows another possible arrangement for an enhancement delivery element.

FIG. 8A is a block drawing that shows one possible arrangement for an enhancement delivery element 360. Each type of enhancement, 1-$n$, has associated with it an enhancement dispenser, 1-$n$, respectively. FIG. 8B shows another possible arrangement for an enhancement delivery element 360. All enhancements, 1-$n$, are dispensed through the same dispenser. There are many other possible arrangements, such as those with certain types of enhancement grouped together and sharing one dispenser and other types of enhancement each having its own dispenser.

Enhancements are dispensed into filtered water as the filtered water exits the water enhancement system. The enhancement dispenser can be a mechanical dispenser, electrostatic dispenser, magnetic dispenser, electromagnetic dispenser. or any combination thereof.

Dispensing can occur only when the enhancement control system 300 is in a state that allows dispensing. If dispensing is allowed, dispensing can occur with no additional user action except pouring or flowing filtered water from the enhanced water system. For example, for a flow through pitcher enhanced water system, actual dispensing of enhancement into filtered water can occur when the enhanced water system is tilted beyond a certain angle, as when the user begins to pour water. In some arrangements, the dispensing can occur in response to a pressure change or a flow change caused by pouring water from the system. In some arrangements, the dispensing can occur in response to detection of filtered water by a sensor at the enhanced water system exit.

Further discussion of dispensing can be found in U.S. patent application Ser. No. 10/825,344, filed on Apr. 15, 2004, which, as stated above, is included by reference herein.

Control Logic

The control logic element 310 coordinates and controls operation of the dosing control system 300. For complex control systems 300 that include all or most of the elements shown in FIG. 3 or more, the control logic element 310 may be a device that can load and execute algorithms. In some embodiments, the control logic element 310 is a logic gate (i.e., AND gate, NAND gate, OR gate, NOR gate, and NOT gate), a combination of logic gates, or a combination of logic gates and other electronic devices. Logic gates can also be constructed from relays, diodes, fluidics and optical elements. In other embodiments, the control logic element 310 is a transistor (i.e., bipolar transistor, FET transistor, or CMOS transistor) or transistors, or a combination of transistors and other electronic devices. In another embodiment, the control logic element 310 is a microcontroller or microprocessor. In yet other embodiments, the control logic element 310 can be any combination of devices that will perform the desired functions. In one arrangement, algorithms are stored in the memory element 340 and are loaded and executed by the control logic element 310. In other arrangements, the logic element 310 has its own associated logic memory element that can store algorithms. The logic element 310 can load and execute the algorithms from its own logic memory element.

The control logic element can execute an algorithm to modify enhancement delivery instructions before transmitting the instructions to the enhancement delivery element 360. The algorithm can use data, such as information from the input element and the communication element, programs and records from the memory element, and information from the monitor element, to modify the enhancement delivery instructions.

Method

In one embodiment, a serving of enhanced filtered water is produced by an enhanced filtered water system that has an input element 320 and an enhancement delivery element 360 using the following steps. The serving size can be varied depending on the preference of the user. The user uses the input element 320 to enable transmittal of an enhancement delivery instruction. The means by which an input element can enable transmittal of the instruction have been discussed above. The user allows the enhancement delivery element 360 to receive the enhancement delivery instruction and then to dispense an enhancement into a serving of filtered water according to the instruction.

In another embodiment, a serving of enhanced filtered water is produced by an enhanced filtered water system that has additional elements using the following steps. The input element 320 contains an electronic device and the user uses the electronic device to identify the user, by any of the means that have been described above. The user allows the control logic element 310 to access stored information associated with the user from the memory element 350, the stored information including a program of scheduled enhancements. The user allows the communication element 330 to display at least a portion of the program of scheduled enhancements. The user activates the program to send an enhancement delivery instruction according to at least a portion of the program to the enhancement delivery element 360.

In yet another embodiment, a serving of enhanced filtered water is produced by an enhanced filtered water system that has additional elements using the following steps. The input element 320 contains an electronic device and the user uses the electronic device to identify the user, by any of the means that have been described above. The user allows the control logic element 310 to access stored information associated with the user from the memory element 350, the stored information including a program of scheduled enhancements. The user allows a monitor element 350 to provide outside information to the system. Examples of the information that the monitor element(s) 350 can provide have been discussed above. The user allows the control logic element 310 to apply a predetermined algorithm to modify the program of scheduled enhancements using the outside information. The user allows the communication element 330 to display at least a portion of the modified program of scheduled enhancements. The user activates the program to send an enhancement delivery instruction according to at least a portion of the modified program to the enhancement delivery element 360.

In one arrangement, a serving of enhanced filtered water is produced by an enhanced filtered water system using the following steps. A user inputs a health symptom to the system through the input element 320. The user allows the control logic element 310 to query the memory element 340 for suggested enhancements that may be helpful in alleviating the health symptom. The system displays the suggested enhancements on the communication element 330. The user chooses an enhancement(s) from the suggested enhancements. The user uses either the input element 320 or the communication element 330 to initiate an instruction to the enhancement delivery element 360 to prepare a serving of enhanced filtered water containing the chose enhancement(s). The user allows the enhancement delivery element to receive the enhancement delivery instruction and to dispense the chosen enhancement(s) into a serving of filtered water.

Example 1

A very simple enhancement control system 300 includes a dropper bottle (i.e., a bottle of enhancement and a liquid dropper with a squeeze bulb) that is associated with a water filtration system, such as a pour-through system or a faucet mount system. The dropper bottle contains an echinacea enhancement in liquid form. Steps for using such a manual control system are shown in FIG. 9. In step 910, a user squeezes a squeeze bulb (input element 320) on the dropper 5 times, thus sending enhancement delivery instructions to the other end of the dropper (the enhancement delivery element 360) to dispense 5 drops of echinacea into an outlet of the water enhancement system. In step 920, the user activates the enhanced water system to flow filtered water (either from a pour-through pitcher or a faucet mount water filtration device) through the outlet of the enhanced water system, thus mixing filtered water with the echinacea enhancement. In step 930, the enhanced filtered water flows into a container.

In a variation on Example 1, the desired number of drops of enhancement can be squeezed into a separate serving container. The container can be filled with filtered water. As the filtered water mixes with the enhancement, the filtered water becomes enhanced water. In yet another variation, the desired number of drops of enhancement can be added to the filtered water as it leaves the water filtration system.

In this example, the input element 320 is the squeeze bulb on the liquid dropper. The enhancement delivery instructions are the squeezes a user makes on the squeeze bulb of the dropper bottle. The enhancement delivery element 360 includes the bottle of enhancement (enhancement storage) and the liquid dropper (enhancement dispenser).

Example 2

In another example, a manual enhancement control system 300 contains four lights (communication element 330) each of which has a label for a particular enhancement in the enhancement control system 300 inventory and a particular dose for each enhancement. Steps for using such a manual enhancement control system 300 are shown in FIG. 10. In step 1010, a user moves a lever next to the light indicating Vitamin C on the input element 320 to choose a dose of Vitamin C enhancement. Enhancement delivery instructions are sent to an enhancement delivery element 360 and, in step 1020, the enhancement delivery element 360 dispenses a dose of Vitamin C into the outlet of the water enhancement system. In step 1030, the user activates the enhanced water system to flow filtered water through the outlet, mixing filtered water with Vitamin C enhancement. In step 1040, the filtered water enhanced with Vitamin C flows into a container.

Example 3

Figure 11:
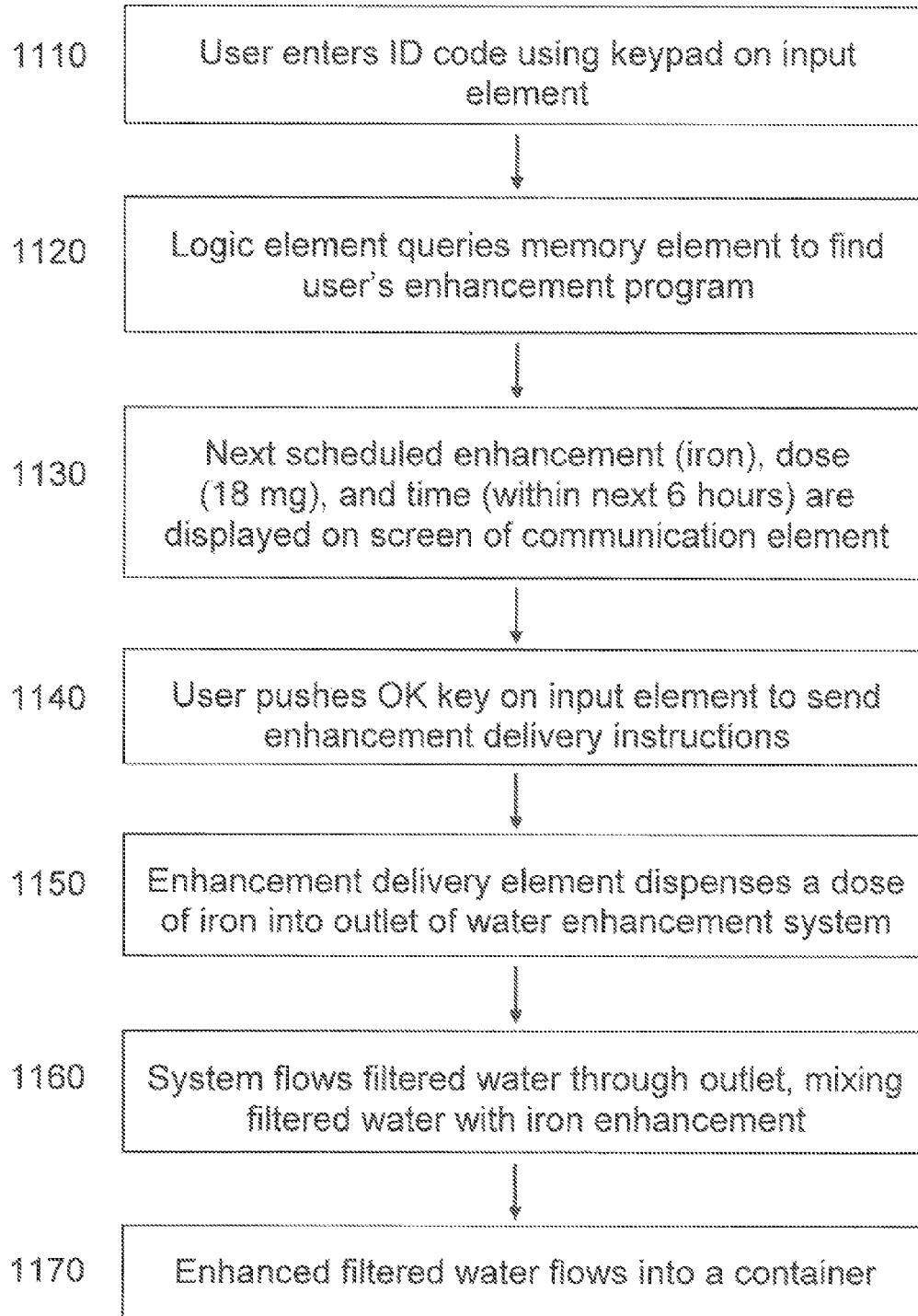
FIG. 11 is a block diagram that outlines the steps for using a control system as discussed in Example 3.

The steps in Example 3 for a semi-automatic control system are shown in FIG. 11. In step 1110, a user enters an identification code into an enhancement control system 300 using a keypad on the input element 320. In step 1120, a control logic element 310 queries a memory element 340 to find the user's stored enhancement program. In step 1130, a screen (communication element 330) displays the next scheduled enhancement (iron), dose (18 mg), and time (within the next 6 hours) in the program. In step 1140, the user pushes an OK key on the input element 320 to send enhancement delivery instructions to prepare enhanced filtered water according to the program. Enhancement delivery instructions are sent to the appropriate enhancement delivery element 360. In step 1150, the enhancement delivery element 360 dispenses a dose of iron into the outlet of the water enhancement system. In step 1160, the enhanced water system flows filtered water through the outlet, mixing filtered water with the iron enhancement. In step 1170, enhanced filtered water flows into a container.

Example 4

Figure 12B:
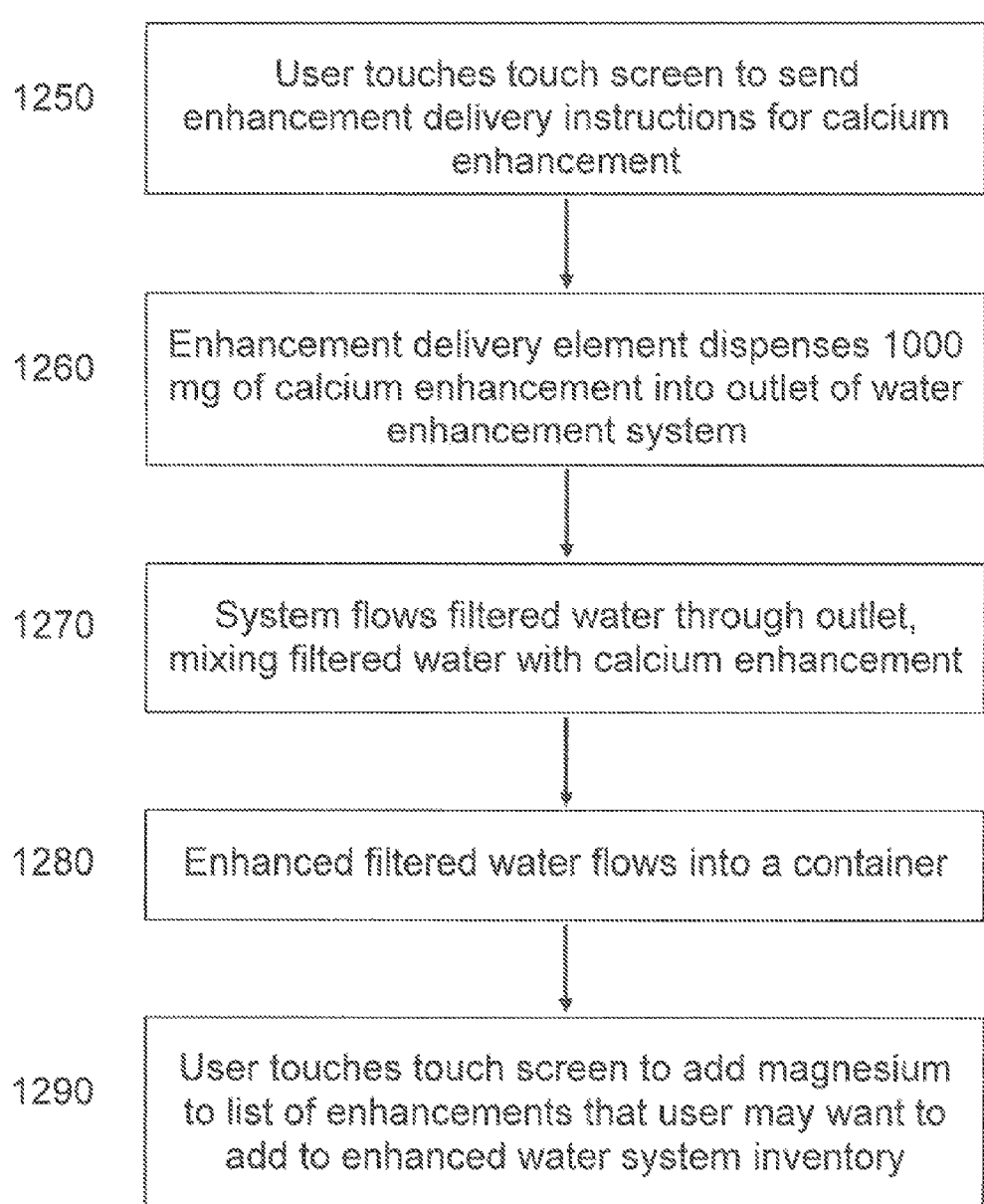
FIG. 12B is a continuation of the block diagram in FIG. 12A, which outlines the next five steps for using a control system as discussed in Example 4.

The steps in Example 4 for a semi-automatic control system are shown in FIG. 12A and continued in FIG. 12B. In FIG. 12A, in step 1210, a user swipes an ID card with a magnetic strip through a magnetic card reader (in input element 320). In step 1220, the user attaches a blood pressure cuff to his/her arm and pushes a button on the input element 320 to start blood pressure measurement, the value of which is stored in memory element 340 when complete. In step 1230, the logic element 310 queries the memory element 340 for the user's personal profile, blood pressure history, current blood pressure value, environmental data, enhancement program(s), dispensing history, and enhancement inventory, and then uses algorithms to determine useful enhancement(s). In step 1240, based in part on a slightly elevated blood pressure value, a recommendation for enhancements calcium (currently available in system) and magnesium (not currently available in system) are displayed on a touch screen of a communication element 330. Continuing in FIG. 12B, in step 1250, the user touches the touch screen to send enhancement delivery instructions for 1000 mg of calcium enhancement. In step 1260, the enhancement delivery element 360 dispenses 1000 mg of calcium enhancement into the outlet of the water enhancement system. In step 1270, the enhanced water system flows filtered water through the outlet, mixing filtered water with the calcium enhancement. In step 1280, enhanced filtered water flows into a container. In step 1290, the user touches the touch screen to add magnesium to a list of enhancements the user may want to add to the enhanced water system inventory.

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

We claim:

1. A gravity-flow water enhancement system, comprising:
a housing including a source water container having an inlet for receiving source water and a treated water container for storing treated water;
a filter component within the housing and in fluid communication with both the source water container and the treated water container, wherein source water introduced to the source water container is converted into treated water as it flows through the filter component under the influence of gravity;
the housing further including an outlet in fluid communication with the treated water container for outflow of a stream of treated water;
a first enhancement module disposed outside the housing adjacent the outlet, the first enhancement module being effective to dispense a desired amount of a first enhancement for use in combining with treated water dispensed from the outlet; and
wherein the first enhancement module includes a disposable cartridge with a reservoir for holding the first enhancement.

2. The enhanced water system of claim 1, wherein the first enhancement mixes with a serving of filtered water at the point of use.

3. The enhanced water system of claim 1, wherein the disposable cartridge includes a reservoir.

4. The water enhancement system of claim 1, wherein the first enhancement is in the form of a liquid.

5. The water enhancement system of claim 1, wherein the first enhancement is selected from the group consisting of minerals, vitamins, herbal supplements, nutritional supplements, phytonutrients, probiotics, homeopathic remedies, amino acids, enzymes, hormones, standard prescription medications and over-the-counter medications, and combinations thereof.

6. The water enhancement system of claim 5, further comprising a secondary aesthetic enhancement selected from the group consisting of coloring agents, flavoring agents, natural fruit flavor extracts, artificial fruit flavor extracts, botanical flavor extracts, fruit juice, edible acids, natural sweeteners, artificial sweeteners, antioxidants, taste indicators, visual indicators, and combinations thereof.

* * * * *